United States Patent
Cecil et al.

(10) Patent No.: US 9,612,669 B2
(45) Date of Patent: Apr. 4, 2017

(54) PROBABILITY-BASED APPROACH TO RECOGNITION OF USER-ENTERED DATA

(71) Applicant: Nuance Communications, Inc., Burlington, MA (US)

(72) Inventors: Matthew Cecil, Burlington, MA (US); Santosh Sharan, Acton, MA (US); Jason Lachapelle, Burlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/987,065

(22) Filed: Jan. 4, 2016

(65) Prior Publication Data

US 2016/0116994 A1    Apr. 28, 2016

Related U.S. Application Data

(63) Continuation of application No. 14/083,296, filed on Nov. 18, 2013, now Pat. No. 9,268,764, which is a continuation of application No. 12/186,425, filed on Aug. 5, 2008, now Pat. No. 8,589,149.

(51) Int. Cl.
*G06F 17/21* (2006.01)
*G06F 3/023* (2006.01)
*G06F 17/27* (2006.01)
*G06F 17/25* (2006.01)
*G06F 3/0488* (2013.01)

(52) U.S. Cl.
CPC ........ *G06F 3/0237* (2013.01); *G06F 3/04886* (2013.01); *G06F 17/25* (2013.01); *G06F 17/273* (2013.01); *G06F 17/276* (2013.01); *G06F 17/2735* (2013.01)

(58) Field of Classification Search
CPC .... G06F 3/0237; G06F 17/273; G06F 3/0219; G06F 3/0489; H04M 1/271; H04M 1/677; H04M 1/72552; H04M 1/7258; H04M 1/72588; H04M 2250/22
USPC ................ 704/9, 10, 236, 500, 270; 725/40; 715/810, 257; 455/550.1, 413, 404.1; 382/187; 379/88.01; 345/172, 169; 341/22; 200/600
See application file for complete search history.

(56) References Cited

U.S. PATENT DOCUMENTS

| | | | |
|---|---|---|---|
| 5,963,666 A * | 10/1999 | Fujisaki | G06K 9/723 382/187 |
| 7,030,863 B2 | 4/2006 | Longe et al. | |
| 7,098,896 B2 | 8/2006 | Kushler et al. | |
| 7,117,144 B2 | 10/2006 | Goodman et al. | |

(Continued)

OTHER PUBLICATIONS

U.S. Appl. No. 14/083,296, filed Nov. 18, 2013, titled "Probability-Based Approach to Recognition of User-Entered Data".

(Continued)

*Primary Examiner* — Michael Colucci
(74) *Attorney, Agent, or Firm* — Perkins Coie LLP

(57) ABSTRACT

A method for entering keys in a small key pad is provided. The method comprising the steps of: providing at least a part of keyboard having a plurality of keys; and predetermining a first probability of a user striking a key among the plurality of keys. The method further uses a dictionary of selected words associated with the key pad and/or a user.

20 Claims, 3 Drawing Sheets

(56) References Cited

U.S. PATENT DOCUMENTS

| | | | |
|---|---|---|---|
| 7,129,932 B1 | 10/2006 | Klarlund et al. | |
| 7,151,530 B2 | 12/2006 | Roeber et al. | |
| 7,218,249 B2 | 5/2007 | Chadha | |
| 7,259,751 B2 | 8/2007 | Hughes et al. | |
| 7,277,088 B2 | 10/2007 | Robinson et al. | |
| 7,287,026 B2 | 10/2007 | Oommen | |
| 7,319,957 B2 | 1/2008 | Robinson et al. | |
| 7,453,439 B1 | 11/2008 | Kushler et al. | |
| 7,542,029 B2 | 6/2009 | Kushler | |
| 7,565,265 B2 | 7/2009 | Kuhlman | |
| 7,602,377 B2 * | 10/2009 | Kim | H04M 1/67 345/169 |
| 7,689,588 B2 | 3/2010 | Badr et al. | |
| 7,777,728 B2 | 8/2010 | Rainisto | |
| 7,809,574 B2 * | 10/2010 | Roth | G10L 15/19 704/270 |
| 7,810,030 B2 | 10/2010 | Wu et al. | |
| 7,912,700 B2 | 3/2011 | Bower et al. | |
| 7,920,132 B2 | 4/2011 | Longe et al. | |
| 7,957,955 B2 | 6/2011 | Christie et al. | |
| 8,201,087 B2 | 6/2012 | Kay et al. | |
| 8,225,203 B2 | 7/2012 | Unruh | |
| 8,589,149 B2 | 11/2013 | Cecil et al. | |
| 8,666,728 B2 | 3/2014 | Rigazio et al. | |
| 8,704,775 B2 | 4/2014 | Cantrell | |
| 8,816,976 B2 | 8/2014 | Bhattacharjee | |
| 8,934,611 B2 * | 1/2015 | Doulton | G10L 15/265 379/88.01 |
| 9,043,725 B2 * | 5/2015 | Wakefield | G06F 3/0202 341/33 |
| 9,268,764 B2 | 2/2016 | Cecil et al. | |
| 2003/0011574 A1 * | 1/2003 | Goodman | G06F 3/0237 345/172 |
| 2004/0183833 A1 | 9/2004 | Chua | |
| 2005/0114115 A1 | 5/2005 | Karidis et al. | |
| 2005/0116840 A1 * | 6/2005 | Simelius | H04M 1/67 341/22 |
| 2005/0289463 A1 | 12/2005 | Wu et al. | |
| 2006/0176283 A1 * | 8/2006 | Suraqui | G06F 3/0237 345/169 |
| 2007/0188472 A1 * | 8/2007 | Ghassabian | B41J 3/445 345/169 |
| 2008/0119217 A1 * | 5/2008 | Coxhill | H04M 1/67 455/550.1 |
| 2008/0133222 A1 | 6/2008 | Kogan et al. | |
| 2008/0138135 A1 | 6/2008 | Gutowitz | |
| 2008/0189605 A1 * | 8/2008 | Kay | G06F 3/0237 715/257 |
| 2009/0008234 A1 * | 1/2009 | Tolbert | H01H 13/702 200/600 |
| 2009/0089666 A1 | 4/2009 | White et al. | |
| 2009/0109067 A1 * | 4/2009 | Burstrom | G06F 17/276 341/22 |
| 2009/0249198 A1 | 10/2009 | Davis et al. | |
| 2009/0262078 A1 * | 10/2009 | Pizzi | G06F 1/1626 345/169 |
| 2009/0328101 A1 * | 12/2009 | Suomela | H04N 5/44543 725/40 |
| 2010/0035583 A1 * | 2/2010 | O'Connell | H04M 3/533 455/413 |
| 2010/0134328 A1 * | 6/2010 | Gutowitz | G06F 3/0233 341/22 |
| 2010/0225591 A1 | 9/2010 | Macfarlane | |
| 2010/0304704 A1 * | 12/2010 | Najafi | H01Q 1/242 455/404.1 |
| 2010/0321299 A1 | 12/2010 | Shelley et al. | |
| 2011/0018812 A1 | 1/2011 | Baird | |
| 2011/0119623 A1 | 5/2011 | Kim | |
| 2011/0264442 A1 | 10/2011 | Huang et al. | |
| 2012/0047454 A1 | 2/2012 | Harte | |
| 2012/0203544 A1 | 8/2012 | Kushler | |
| 2012/0254744 A1 | 10/2012 | Kay et al. | |
| 2014/0198047 A1 | 7/2014 | Unruh et al. | |
| 2014/0198048 A1 | 7/2014 | Unruh et al. | |
| 2016/0034046 A1 | 2/2016 | Waddell et al. | |

OTHER PUBLICATIONS

U.S. Appl. No. 13/366,225, filed Feb. 3, 2012, titled "Correcting Typing Mistakes Based on Probabilities of Intended Contact for Non-Contacted Keys".

U.S. Appl. No. 13/830,674, filed Mar. 14, 2013, titled "Reducing Error Rates for Touch Based Keyboards".

U.S. Appl. No. 13/873,078, filed Apr. 29, 2013, titled "Reducing Error Rates for Touch Based Keyboards".

U.S. Appl. No. 14/450,095, filed Aug. 1, 2014, titled "System and Methods for Determining Keyboard Input in the Presence of Multiple Contact Points".

International Search Report and Written Opinion for International Application No. PCT/US2012/023884, Applicant: Nuance Communications, Inc., Date of Mailing: Sep. 3, 2012, 8 pages.

International Search Report for International Application No. PCT/US2014/011538, Applicant: Nuance Communications, Inc., Date of Mailing: Apr. 16, 2014, 3 pages.

\* cited by examiner

Fig. 1                    Fig. 1A

PROBABILITY-BASED APPROACH TO RECOGNITION OF USER-ENTERED DATA

This application claims the benefit of U.S. patent application Ser. No. 14/083,296 filed Nov. 18, 2013, entitled "A PROBABILITY-BASED APPROACH TO RECOGNITION OF USER-ENTERED DATA" and U.S. patent application Ser. No. 12/186,425 filed Aug. 5, 2008, entitled "A PROBABILITY-BASED APPROACH TO RECOGNITION OF USER-ENTERED DATA" which is incorporated herein by reference in its entirety.

TECHNICAL FIELD

This invention relates to an apparatus and methods for data entry, more specifically this invention relates to an apparatus and methods for a probability-based approach to data entry.

BACKGROUND

Data entry using a key board or a key pad is known. However, a user may mistakenly enter an unintended key within a neighborhood of the intended key. Therefore, it is desirable to provide a probability based scheme to determine the intended input of the user based upon the sequence of entered keys.

SUMMARY

There is provided a method comprising the steps of: providing at least a part of keyboard having a plurality of keys; and associating a probability distribution to each key on the key board.

There is provided a method for entering data by pressing keys on a key pad, be it a key pad with physical keys or an arrangement of domains on a touch screen, comprising the steps of: providing at least a part of keyboard having a plurality of keys; and predetermining probabilities of the user striking a key among the plurality of keys, given the intended key.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1A illustrates a discrete probability density based upon FIG. 1.

Figure 1:
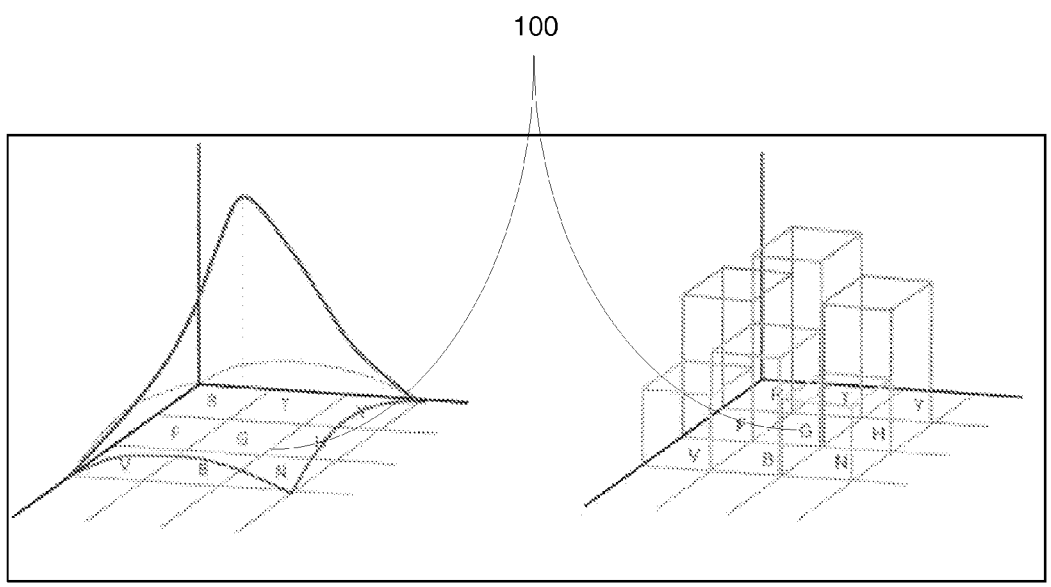
FIG. 1 illustrates an example of a continuous probability density based key entry scheme on a portion of a first key board.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the figures represent just one possible example of the method outlined in the sequel.

DETAILED DESCRIPTION

Before describing in detail embodiments that are in accordance with the present invention, it should be observed that the embodiments reside primarily in combinations of method steps and apparatus components related to discerning and/or using probability based method or apparatus to process user-entered data. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The purpose of the present invention is to describe a method and apparatus for discerning user input on portable keyboards in devices such as mobile computers and smartphones, where it is assumed that the means of input (keyboard or touch screen) is such that mistakes sometimes occur (e.g. individual keys on the keyboard are smaller than the human finger, etc.). Listed infra are a few examples. However, the present invention is contemplated for a variety of data entry scenarios including any sized or shaped key pads or key boards, as well as any suitable data entry means.

The present patent application describes two examples for expository purposes: first, typing text on a QWERTY keyboard; and second, entering UPC codes of items on a numerical keypad. We will refer to these examples as "example 1" and "example 2" respectively. It should be understood that the present invention applies to many scenarios beyond these two. The general setup is described below.

DEFINITION OF TERMS

1. The term "keyboard" comprises any means of user input. The keyboard comprises of keys, which is as previously indicated. The keyboard comprises physical keys or may simply comprise domains on a touch screen. Lowercase Greek letters are used to denote a generic key (for example $\alpha$; $\beta$; etc.), while capital letter such as K will be used to denote the set of all keys.

2. The term "word" will be used to indicate an item of intended user input. If the user is writing for text input, this would be a word in the appropriate language. If, for example, the user is checking inventory by inputting UPC codes subject items in a warehouse environment, a word would be the UPC code of an item in inventory. It is assumed that the user intends on entering a word using the keyboard, and mistakes sometimes occur.

3. The term "dictionary" will be used to indicate a pre-determined set of words. In the case of text input, this will be an actual dictionary or lexicon, where in the case of numerical code input this would be a list of all items, for example, in inventory and their UPC codes.

4. The term "string" will be used in reference to the actual user input. This may or may not be a word, since part of the assumption is that the user is prone to making mistakes. However, it is assumed that each string is meant to be a word from the dictionary.

The proposed general setup is as follows. A keyboard is provided, as is a dictionary of words. It will be assumed that the user intends on entering a word from the subject dictionary using the keyboard. Dependent on the arrangement and form of the provided keyboard, there will be a number associated to each pair of keys $(\alpha,\beta)$ indicating the probability that key $\beta$ will be pressed when key $\alpha$ is intended. Thus given a user entered string, one is able to associate to every dictionary word a number indicating the likelihood that the entered string would occur given the dictionary word was intended (see further description infra). This works by viewing each keystroke as an independent event, with probabilities given as described above. Combined with optional additional probabilities indicating the likelihood each word was intended, one gets a probability associated to each dictionary word indicating the likelihood it was intended by the user. These scores or results are then used to rank dictionary words according to the most likely outcome (see further description infra).

Referring to FIG. 1, a part of a QWERY keyboard 100 is shown, in reference to example 1. Assuming a typical user (not shown) intends upon pressing or hitting the "G" key, the user would most likely have a direct hit upon the "G" key. However, the user may hit other keys in close proximity to the "G" key albeit with a lower probability. This scenario occurs most often when the keyboard is too small to accommodate the user's entering means such as fingers. Alternatively, the user may just be careless or has a physical limitation preventing an accurate key entry. As can be seen, FIG. 1 is meant to give a representation of how a user might miss the "G" key; it is a representation of a continuous probability density centered on the "G" key.

Referring to FIG. 1A, a discrete probability density based upon FIG. 1 is shown. Since pressing a key yields the same input regardless of precisely where the key was struck, such a discrete probability density is more useful. As can be seen, intending upon hitting "G" key and actually hitting the "G" key typically has the highest probability. Other keys proximate to the "G" key have relatively low probabilities.

It should be noted that such probability densities are assumed to be arbitrary. We have chosen to represent the specific example of typing on a QWERTY keyboard, where we have chosen the probability densities to be roughly Gaussian. Practically, these probability densities can be preset or determined by experimental testing. The densities are directly related to the "probability matrix" described below.

FIGS. 1-1A generally assume that a user is entering text on a keyboard (physical or touch screen, QWERY or otherwise). The assumption is that the user is entering a word in a predetermined dictionary. The algorithm or a method suitable for computer implementation will attempt to discern the word which the user intends on entering, whereby allowing for the user to make typing errors and correcting the errors based upon probability (see infra). The primary assumption is that the user does not make 'large' mistakes, but may make many 'small' mistakes. This will be explained precisely infra.

Figure 2:
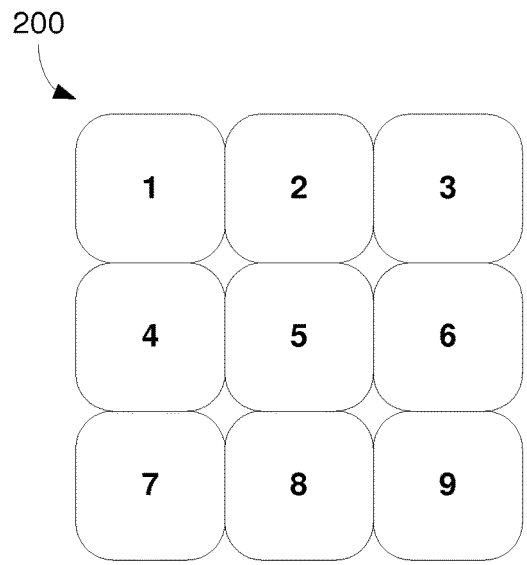
FIG. 2 illustrates a second key board layout of the present invention.

Referring to FIG. 2, a second key board layout 200 of the present invention is shown in relation to example 2. Key board layout 200 has nine keys ranging from one-to-nine (1-9). Key board layout 200 forms a part of a typical numerical key pad.

Figure 2A:
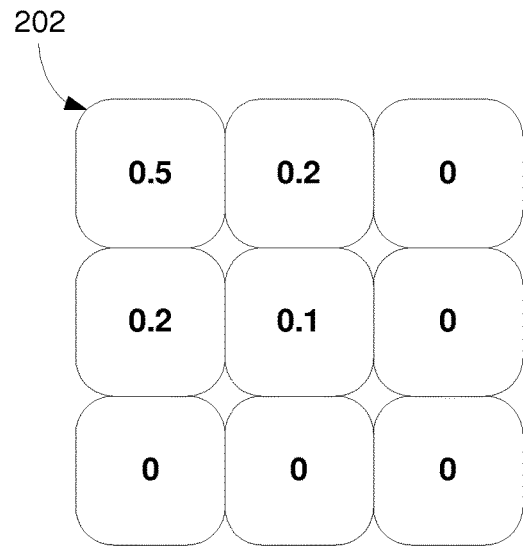
FIG. 2A illustrates a probability distribution associated to key 1 of FIG. 2.
Figure 2B:
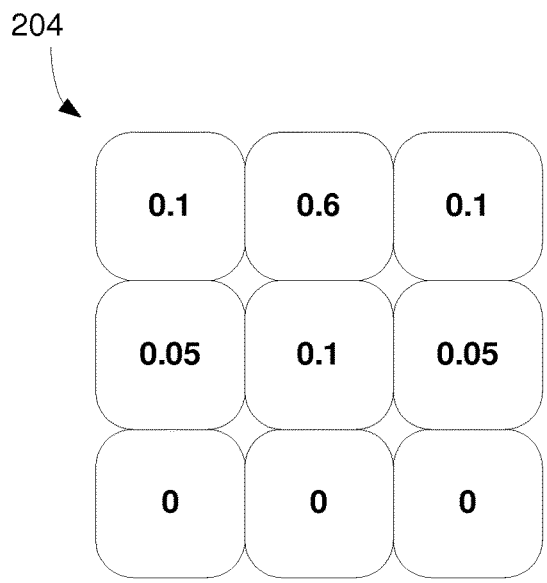
FIG. 2B illustrates a probability distribution associated to key 2 of FIG. 2.
Figure 2C:
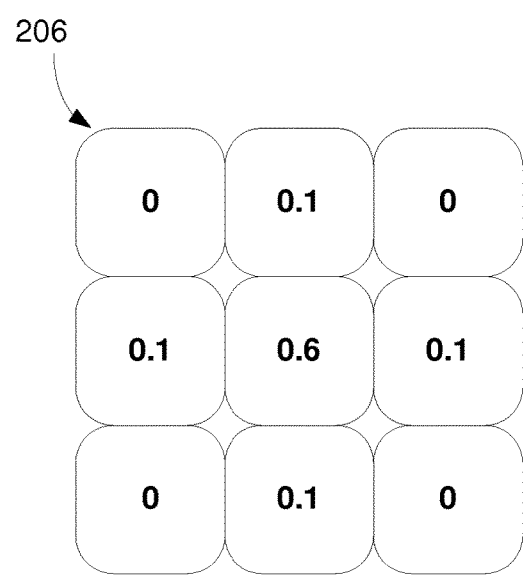
FIG. 2C illustrates a probability distribution associated to key 5 of FIG. 2.

Referring to FIGS. 2A-2C, a sequence of three scenarios of probability densities of keys on the key board layout 200 of FIG. 2 is shown. Note that the number associated to each key in FIGS. 2A-2C is analogous to the height of the density in FIG. 1A.

In FIG. 2A, a first scenario 202 in which a user intends to strike or press number "1" key is shown. According to this specific probability distribution, the probability of the user hitting number "1" key is 0.5. Similarly, the probability of the user hitting number "2" key and number "4" key are 0.2 respectively. The probability of the user hitting number "5" key is 0.1. Note that it is highly, unlikely that the user will hit keys "3", "6", "7", "8", and "9". Therefore, the probability of hitting keys "3", "6", "7", "8", and "9" is zero.

In FIG. 2B, a second scenario 204 in which a user intends to strike or press number "2" key is shown. According to this specific probability distribution, the probability of the user hitting number "2" key is 0.6. Similarly, the probability of the user hitting number "1" key and number "3" key and number "5" key are 0.1 respectively. The probability of the user hitting number "4" key and number "6" key is 0.05. Note that it is highly, unlikely that the user will hit keys "7", "8", and "9". Therefore, the probability of hitting keys "7", "8", and "9" is zero.

In FIG. 2C, a third scenario 206 in which a user intends to strike or press number "5" key is shown. According to this specific probability distribution, the probability of the user hitting number "5" key is 0.6. Similarly, the probability of the user hitting number "2" key, number "4" number "6" key, number "8" keys are 0.1 respectively. Note that it is highly, unlikely that the user will hit keys "1", "3", "7", and "9". Therefore, the probability of hitting keys "1", "3", "7", and "9" is zero.

As can be seen, FIGS. 2-2C follows example 2 in which the user is entering numerical codes. The numerical codes include codes which correspond to inventory or products (UPC code, for example). Here the 'keyboard' might be a small numerical keypad, physical or touch screen. This scenario is used to produce examples infra.

Probability Matrix

The qualities of the keyboard (hardware attributes, shape, number of keys, etc) determine how likely the user is to strike keys other than his intended key. Further, entrenched user typing behaviors sometimes affect the likelihood or the probabilities as well. For each pair of keys $(\alpha/\beta)$ we give a probability (a number ranging from 0 to 1 indicating a probability or likelihood) that the user strikes $\beta$ when he intends on striking $\alpha$. We will call this probability $P(\alpha;\beta)$. Notice since it is assumed that the user will press some key, we have the relationship $$\Sigma_{\beta \in K} P(\alpha,\beta) = 1 \text{ for all } \alpha \in K \qquad (1)$$

To account for the scenario when the user misses the keyboard entirely, we can consider the complement of the keyboard as another key in itself. This is particularly applicable to the touch screen scenario.

Once an order is assigned to the keys, this set of probabilities can be written as an n×n matrix, where n denotes the number of keys on our keyboard. We let $P=\{p_{ij}\}$, where $p_{ij}$ is the probability that the user presses the $j^{th}$ key when he intends on pressing the $i^{th}$ key. P will be referred to as the "probability matrix". In terms of this matrix, Eq. 1 indicates that the entries in any row sum to 1.

Suppose our keyboard consists of 9 numerical keys arranged in the format as shown in FIG. 2. Associated to this keyboard, we have a 9×9 matrix, where the ordering of the keys is given by their numerical order.

$$P = \begin{pmatrix} .5 & .2 & 0 & .2 & .1 & 0 & 0 & 0 & 0 \\ .1 & .6 & .1 & .05 & .1 & .05 & 0 & 0 & 0 \\ 0 & .2 & .5 & 0 & .1 & .2 & 0 & 0 & 0 \\ .1 & .05 & 0 & .6 & .1 & 0 & .1 & .05 & 0 \\ 0 & .1 & 0 & .1 & .6 & .1 & 0 & .1 & 0 \\ 0 & .05 & .1 & 0 & .1 & .6 & 0 & .05 & .1 \\ 0 & 0 & 0 & .2 & .1 & 0 & .5 & .2 & 0 \\ 0 & 0 & 0 & .05 & .1 & .05 & .1 & .6 & .1 \\ 0 & 0 & 0 & 0 & .1 & .2 & 0 & .2 & .5 \end{pmatrix}$$

So, this matrix indicates that the user will press the "6" key 10% of the time he intends on pressing the "5" key (since p56=0.1). Notice the matrix also indicates that the user "will never" miss an intended key by a large amount or on keys not in close proximity to the intended key. For example, since p46=0, it is assumed that the user will never press "6" when "4" is intended. One should compare row 1 of P to FIG. 2A, row 2 to FIG. 2B, and row 5 to FIG. 2C.

The probability matrix (Eq. 2) acts as the model for user input. The more accurate this model, the more efficiently our algorithm or method suitable of computer application will run. Therefore, it is likely that the values for the probability matrix (Eq. 2) associated to a fixed or particular keyboard will be obtained via testing or experiment. It is also possible that the values in the probability matrix (Eq. 2) are user customizable or user specific. It is contemplated that the device of the present invention will initiate a learning phase where the values of the probability matrix are seeded. There may also be stock customizable options (for example, a left-handed user might miss keys differently than a right-handed user).

Comparing to Dictionary Words

The probability matrix (Eq. 2) allows us to associate to every word in our dictionary a probability that the user intended on entering that word given his entered string. This works in the following manner. Suppose the user enters the string "α1α2 α3". We consider the dictionary word "β1β2β3". We know that if the user intended on typing "β1", he would strike "α1" with probability P (β1; α1). Similarly, if the user intended on typing "β2", he would strike "α2" with probability P (β2; α2). Therefore, we can say that if a user intended on typing "β1β2β3", he would type "α1α2α3" with probability P (β; α1) P (β; α2) P (β; α3). In this manner, we associate a number to every dictionary word, based upon the string entered by the user. If the user has entered n letters in the string, only the first n letters of the dictionary words would be used.

Note that this number gives the probability that the user would type the string "α1α2α3" if he intended on typing the word "β1β2β3". We would like to know the probability that the user intended on typing "β1β2β3" given that he typed "α1α2α3". A learned reader will recognize this as a statement of conditional probability. We require an additional piece of information, namely a probability associated to each dictionary word indicating the likelihood that word will be intended. In the text entry example 1, this could be given by word frequency or more sophisticated grammatical tools based on sentence context. In the numerical code entry of example 2, this could be the proportion of each particular item in inventory. The absence of such a likelihood associated to each word can be interpreted as assigning equal likelihood to the occurrence of each dictionary word.

We continue our numerical keypad example 2 as shown in FIG. 2. Here our dictionary is a collection of 4-digit codes which correspond to such things as products in inventory. Suppose the set of these codes is $I=\{1128;2454;3856;9988;2452;1324;6752;4841\}$.

The user then enters the string "684". We then use these three numbers and the values inherent in our probability matrix to associate to each word a probability:

TABLE THREE

| Word | Probability |
|---|---|
| 1128 | p16p18p24 = 0 |
| 2454 | p26p48p54 = 0.00025 |
| 3856 | p36p88p54 = 0.012 |
| 9988 | p96p98p84 = 0.002 |
| 2451 | p26p48p54 = 0.0025 |
| 1324 | p16p38p24 = 0 |
| 6752 | p66p78p54 = 0.012 |
| 4841 | p46p88p44 = 0 |

Assuming that all items exist in equal proportion in inventory, one can then say that the user was most likely trying to enter the codes "6752" or "3856" as both have the highest probability among the set. If it was know that there was a higher proportion of item number "6752" in inventory, then "6752" would then become a better guess than "3856".

Figure 3:
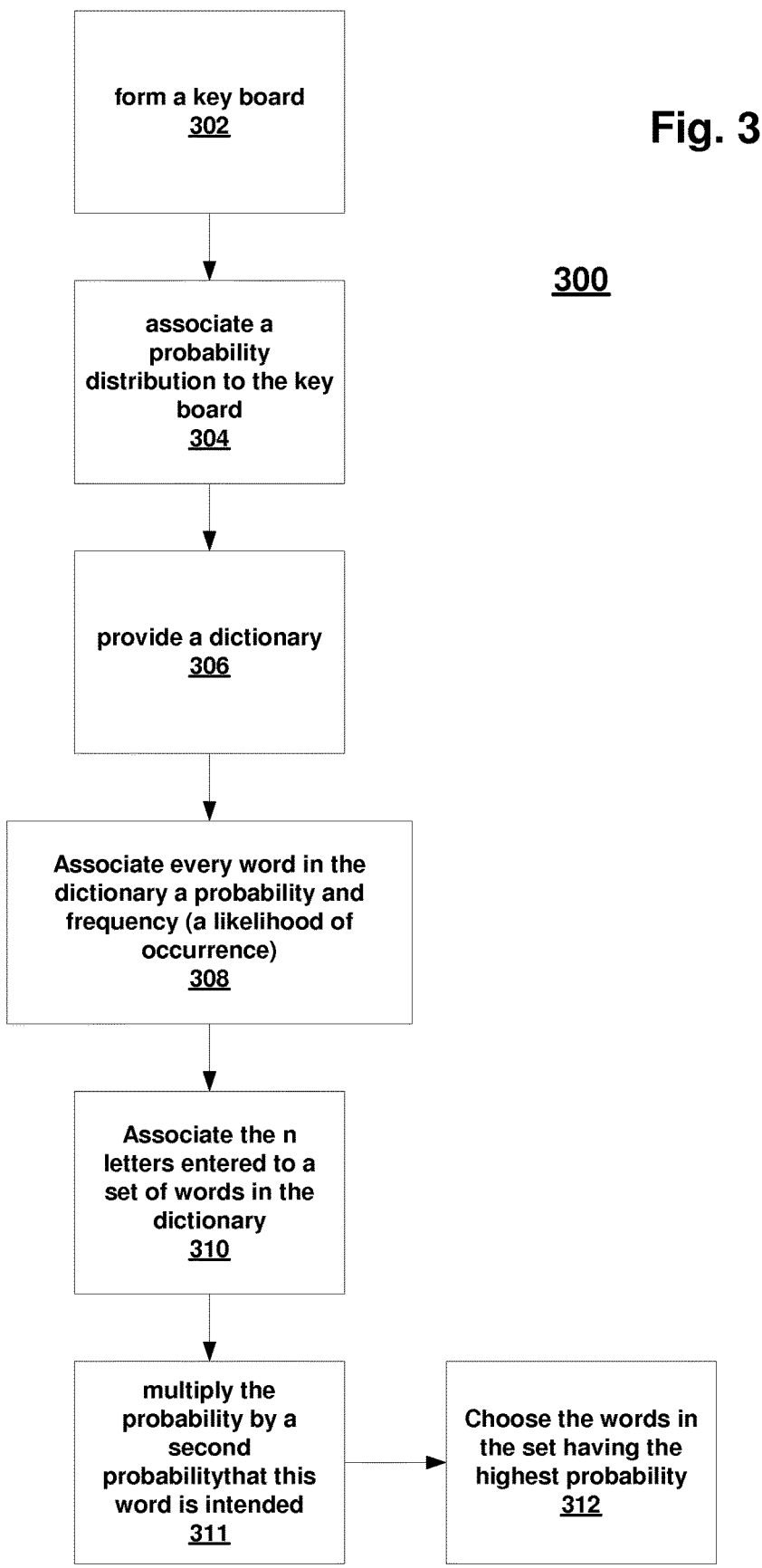
FIG. 3 is a flowchart of the present invention.

Referring to FIG. 3, a flowchart 300 depicting an example for using the present invention is shown. A part of a key board is formed or provided to a user for entering information (Step 302). A probability distribution of a specific group of users regarding the part of key board is determined (Step 304). The probability distribution may be in the form of a probability matrix such as the one shown supra. A dictionary of comprising predetermined words is provided (Step 306). Associate every word in the dictionary a probability and frequency (a likelihood of occurrence) that the user intended on entering that word based upon his entered string (Step 308). In this manner, we associate a number to every dictionary word, based upon the string entered by the user. If the user has entered n letters in the string, only the first n letters of the dictionary words would be used. Associate the n letters entered to a set of words in the dictionary each having a corresponding probability (Step 310). This probability or the first probability is then multiplied by a second probability that this word is intended (as described in the above paragraph) (Step 311). Note that the absence of this step is tantamount to setting each word to be equally likely which in not desired by the present invention. Choose the words in the set having the highest probability as the likely word entered by the user (Step 312).

As can been seen, the present invention describes a method and apparatus for finding the likelihood of words in dictionaries matching with the user input. There may be one or many matches with varying degree of probabilities based on the user input and the quality of the dictionary.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A computer-implemented method for text input, the method comprising:
   receiving a sequence of input characters corresponding to a user actuating multiple areas of an input device;
   computing a first probability for a candidate word of multiple words in a dictionary,
      wherein the first probability for the candidate word is computed by combining multiple character difference probabilities,
      wherein each character difference probability is computed, for each selected character in the sequence of input characters, by applying a probability distribution that indicates, for the selected character, that a character of multiple characters of the candidate word was intended when the area of the input device corresponding to the selected character was actuated;
   obtaining a second probability for the candidate word,
      wherein the second probability for the candidate word indicates a likelihood, independent of the sequence of input characters, of occurrence of the candidate word; and
   in response to receiving the sequence of input characters, selecting the candidate word, using one or more processors, based on a combination of the first probability for the candidate word and the second probability for the candidate word.

2. The computer-implemented method of claim 1, wherein the likelihood indicated by the second probability for the candidate word is based at least in part on one or more of:
   a determination of a frequency with which the candidate word occurs,
   a sentence context into which the candidate word, when selected, will be used;
   a measurement of item availability, wherein the item corresponds to the candidate word; or
   any combination thereof.

3. The computer-implemented method of claim 2, wherein the likelihood indicated by the second probability for the candidate word is based at least in part on the measurement of item availability; and
   wherein the measurement of item availability is a proportion of an item corresponding to the candidate word in an inventory.

4. The computer-implemented method of claim 1, wherein the likelihood indicated by the second probability for the candidate word is based at least in part on a grammatical rule.

5. The computer-implemented method of claim 1, wherein values in the probability distribution are customized based on one or more of:
   a category associated with the user;
   an analysis of input previously provided by the user; or
   any combination thereof.

6. The computer-implemented method of claim 1, wherein values in the probability distribution are customized based on:
   a category associated with the user compromising handedness of the user,
   wherein the user is identified as being a right-handed user; and
   wherein values in the probability distribution are customized to right-handed users.

7. The computer-implemented method of claim 1,
   wherein the input device is a touch screen; and
   wherein at least one of the multiple areas of the touch screen shows a representation of a keyboard key.

8. The computer-implemented method of claim 1, further comprising using a dictionary to select the candidate word.

9. The computer-implemented method of claim 1, further comprising performing a learning phase that computes values of a probability matrix used to compute the first probability, wherein the values of the probability matrix are computed based at least in part on observed user behavior.

10. The computer-implemented method of claim 1, further comprising performing a learning phase that computes values of a probability matrix used to compute the first probability, wherein the values of the probability matrix are computed based at least in part on observed user behavior,
    wherein the probability matrix is an N by N matrix where N is a number of keys represented by the input device; and
    wherein an entry at position (I, J) in the probability matrix is a probability that the $J^{th}$ key was intended when the $I^{th}$ key was pressed.

11. A non-transitory computer-readable storage medium storing instructions that, when executed by a computing system, cause the computing system to perform operations for text input, the operations comprising:
    receiving a sequence of input characters corresponding to a user actuating multiple keys represented on an input;
    computing a character probability for a candidate word of multiple words in a dictionary,
       wherein the character probability for the candidate word is computed by combining character difference probabilities, and
       wherein each character difference probability is computed, for each selected character of multiple characters in the sequence of input characters, by applying a probability distribution that indicates, for the selected character, that a character in the candidate word was intended when the key corresponding to the selected character was actuated; and
    in response to receiving the sequence of input characters, selecting the candidate word, using a processor, based on the character probability for the candidate word.

12. The computer-readable storage medium of claim 11, wherein the operations further comprise obtaining a second probability for the candidate word,
    wherein the second probability for the candidate word indicates a likelihood, independent of the sequence of input characters, of occurrence of the candidate word; and
    wherein selecting the candidate word is further based on the second probability for the candidate word.

13. The computer-readable storage medium of claim 11, wherein the operations further comprise obtaining a second probability for the candidate word,
wherein the second probability for the candidate word indicates a likelihood, independent of the sequence of input characters, of occurrence of the candidate word;
wherein selecting the candidate word is further based on the second probability for the candidate word; and
wherein the likelihood indicated by the second probability for the candidate word is based at least in part on one or more of:
  a determination of a frequency with which the candidate word occurs,
  a sentence context into which the candidate word, when selected, will be used; or
  any combination thereof.

14. The computer-readable storage medium of claim 11, wherein the operations further comprise obtaining a second probability for the candidate word,
wherein the second probability for the candidate word indicates a likelihood, independent of the sequence of input characters, of occurrence of the candidate word;
wherein selecting the candidate word is further based on the second probability for the candidate word; and
wherein the likelihood indicated by the second probability for the candidate word is based at least in part on a grammatical rule.

15. The computer-readable storage medium of claim 11, wherein values in the probability distribution are customized based on one or more of:
  a category assigned to the user;
  an analysis of input previously provided by the user; or
  any combination thereof.

16. The computer-readable storage medium of claim 11, wherein the probability distribution is customized for left-handed users and;
wherein the probability distribution is selected based on a determination of left-handedness of the user.

17. A system for text input comprising:
  a memory;
  one or more processors;
  a touch screen configured to receive a sequence of input characters corresponding to a user actuating multiple virtual keys represented on the touch screen; and
  a word selector configured to, using the one or more processors:
    compute a probability for a candidate word of multiple words in a dictionary,
      wherein the probability for the candidate word is computed by combining character difference probabilities, and
      wherein each character difference probability is computed, for each selected character of multiple characters in the sequence of input characters, by applying a probability distribution that indicates, for the selected character, that a character in the candidate word was intended when the key corresponding to the selected character was actuated; and
    in response to receiving the sequence of input characters, select the candidate word based on the probability for the candidate word.

18. The system of claim 17,
wherein the word selector is further configured to obtain a second probability for the candidate word,
wherein the second probability for the candidate word indicates a likelihood, independent of the sequence of input characters, of occurrence of the candidate word; and
wherein selecting the candidate word is further based on the second probability for the candidate word.

19. The system of claim 17,
wherein the word selector is further configured to obtain a second probability for the candidate word based at least in part on a grammatical rule,
wherein the second probability for the candidate word indicates a likelihood, independent of the sequence of input characters, of occurrence of the candidate word; and
wherein selecting the candidate word is further based on the second probability for the candidate word.

20. The system of claim 17,
wherein the probability distribution is customized for left-handed users and;
wherein the probability distribution is selected based on a determination of left-handedness of the user.

* * * * *